(12) United States Patent
Rothrock

(10) Patent No.: US 9,789,759 B1
(45) Date of Patent: Oct. 17, 2017

(54) ZERO TURNING RADIUS MOWER

(71) Applicant: Deere & Company, Moline, IL (US)

(72) Inventor: Justin Rothrock, Fuquay Varina, NC (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/248,298

(22) Filed: Aug. 26, 2016

(51) Int. Cl.
*F16H 57/027* (2012.01)
*B60K 11/06* (2006.01)
*B60K 5/04* (2006.01)
*B60K 17/08* (2006.01)
*A01D 69/06* (2006.01)
*A01D 101/00* (2006.01)

(52) U.S. Cl.
CPC .............. *B60K 11/06* (2013.01); *A01D 69/06* (2013.01); *B60K 5/04* (2013.01); *B60K 17/08* (2013.01); *A01D 2101/00* (2013.01)

(58) Field of Classification Search
CPC ....... F16H 57/027; B60K 11/06; B60K 17/22; B60K 17/24
USPC .......................................................... 180/339
See application file for complete search history.

(56) References Cited

U.S. PATENT DOCUMENTS

| | | | |
|---|---|---|---|
| 1,974,803 A | 9/1934 | Chilton | |
| 2,872,831 A | 2/1959 | Wood | |
| 3,848,691 A | 11/1974 | Dolan | |
| 3,925,970 A | 12/1975 | Rusco | |
| 4,221,279 A | 9/1980 | Jones et al. | |
| 4,328,659 A | 5/1982 | Seyerle | |
| 4,558,559 A * | 12/1985 | Klever ................... | A01C 21/00 100/210 |
| 4,756,208 A * | 7/1988 | Hayashi ................. | B60K 17/04 180/305 |
| 4,768,997 A | 9/1988 | Page et al. | |
| 4,987,795 A * | 1/1991 | Nguyen ................ | F16H 57/027 464/170 |
| 5,361,566 A | 11/1994 | Hohnl | |
| 5,373,697 A * | 12/1994 | Jolliff ................... | B60K 17/105 60/454 |
| 5,816,034 A * | 10/1998 | Peter ..................... | B60K 7/0015 56/11.4 |
| 5,865,020 A | 2/1999 | Busboom et al. | |
| 5,911,793 A * | 6/1999 | Kaye ....................... | B63H 23/06 74/606 R |
| 6,651,413 B2 | 11/2003 | Papke | |
| 6,718,847 B2 * | 4/2004 | Rimkus ................. | F16H 57/027 184/6.12 |
| 6,951,091 B2 | 10/2005 | Ishii et al. | |
| 6,952,913 B1 | 10/2005 | Crumly | |

(Continued)

FOREIGN PATENT DOCUMENTS

JP 2004190752 A 7/2004

*Primary Examiner* — Jeffrey J Restifo

(57) ABSTRACT

A zero turning radius mower has an internal combustion engine mounted transversely on a pair of longitudinal frame members behind an operator seat and a pair of rear drive wheels. The engine rotates a flywheel on a horizontal axis perpendicular to the longitudinal frame members. A gearbox is mounted to one of the longitudinal frame members, with a horizontal input shaft driven by the engine and a vertical output shaft engaging one or more rubber belts. A vent passage is provided through the output shaft of the gearbox and between a hub of a rotary fan and the output shaft.

12 Claims, 4 Drawing Sheets

(56) References Cited

U.S. PATENT DOCUMENTS

| | | | |
|---|---|---|---|
| 7,047,713 B2 * | 5/2006 | van Wouw | A01D 34/76 56/10.8 |
| 7,427,247 B2 | 9/2008 | Melone | |
| 7,596,934 B2 | 10/2009 | Waesche et al. | |
| 7,665,284 B1 | 2/2010 | Funk et al. | |
| 7,717,219 B2 | 5/2010 | David | |
| 7,726,126 B1 * | 6/2010 | Hauser | F04B 23/06 60/486 |
| 7,856,799 B1 | 12/2010 | Funk et al. | |
| 7,913,479 B2 | 3/2011 | Eavenson, Sr. | |
| 8,984,871 B1 * | 3/2015 | Probst | F15B 11/08 60/387 |
| 2003/0062212 A1 * | 4/2003 | Samejima | A01D 69/03 180/305 |
| 2007/0193408 A1 | 8/2007 | Martinez | |
| 2013/0316866 A1 * | 11/2013 | Kawamura | F16H 57/027 475/160 |
| 2014/0109535 A1 | 4/2014 | Spitz et al. | |
| 2015/0204434 A1 * | 7/2015 | Wiens | F16H 57/027 74/606 R |
| 2017/0002919 A1 * | 1/2017 | Neumann | F16H 57/027 |
| 2017/0159796 A1 * | 6/2017 | Slayter | F16H 57/027 |

* cited by examiner

ZERO TURNING RADIUS MOWER

FIELD OF THE INVENTION

This invention relates to zero turning radius ("ZTR") mowers having rear mounted engines and independently powered left and right drive wheels controlled with hydrostatic transmissions.

BACKGROUND OF THE INVENTION

Zero turning radius ("ZTR") mowers have at least one independently powered drive wheel on each side of a frame. Hydrostatic transmissions transmit power to each of the left and right drive wheels, either in forward or reverse. The pair of hydrostatic transmissions, or dual hydrostatic transmission, may be driven by an internal combustion engine. The independent rear drive wheels allow the ZTR mower to turn on a vertical turning axis. The vertical turning axis may be centrally located between the pair of hydrostatic transmissions.

ZTR mowers have frames with left and right longitudinal frame members supported on a forward end by front wheels and extending rearwardly to support an internal combustion engine. A mower deck may be suspended between the front and rear wheels. A seated operator may use left and right control levers or other steering controls to control the pair of hydrostatic transmissions driving the left and right rear drive wheels.

Internal combustion engines on ZTR mowers are mounted on the mower frame or platform behind the operator seat and rear wheels. Many ZTR mowers have internal combustion engines with vertical drive shafts. Pulleys on the vertical drive shafts drive belts that transmit power from the engine to the pair of hydrostatic transmissions with vertical shafts, and transmit power from the engine to pulleys on vertical shafts of a mower deck. Examples of ZTR mowers with vertical shaft engines include U.S. Pat. No. 5,816,034 for "Belt Design for Mower," U.S. Pat. No. 6,952,913 for "Adjustable Belt Pulley System," U.S. Pat. No. 7,596,934 for "Lawn Mower with Belt Drive System," U.S. Pat. No. 7,717,219 for "Unitary Rear Frame for Mounting Engine, Hydrostatic Transmission, and Other Components to Mower," and U.S. Pat. No. 7,913,479 for "Two-Pulley Belt Tensioning Mechanism."

Alternatively, some ZTR mowers have internal combustion engines, typically with higher horsepower, having horizontal drive shafts oriented along the fore-aft axis of the mower. To transmit power from a horizontal shaft engine to vertical shaft pulleys of the hydrostatic transmissions and mower deck, mule drives are typically used. Mule drives include one or more belts that are driven by a pulley on the engine's horizontal drive shaft, twisting the belt to engage pulleys on vertical shafts of the hydrostatic transmissions and mower deck. Examples of ZTR mowers with horizontal drive shafts and mule drives include U.S. Pat. No. 5,865,020 for "Lawn Mower Having a Lower Center of Gravity," U.S. Pat. No. 6,651,413 for "Multiple Belt Mule Drive Apparatus and Systems/Vehicles Using Same," U.S. Pat. No. 7,427,247 for "Mower Incorporating a Mule Drive," and U.S. Pat. No. 7,665,284 and U.S. Pat. No. 7,856,799 for "Belt Drive for Lawn Mowers."

ZTR mowers with horizontal shaft engine are typically longer than ZTR mowers with vertical shaft engines, because the engines and mule drives extend farther behind the operator seat. Horizontal drive shaft engines and mule drives may extend rearwardly outside the ZTR mower's turning radius or turning circle, reducing the maneuverability of the ZTR mower, especially when mowing close to obstacles. A ZTR mower is needed with a horizontal drive shaft engine, but without the engine or mule drive extending rearwardly outside the ZTR mower's turning radius or turning circle. Additionally, mule drives require substantial distance and space between the horizontal and vertical shafts in order to twist the belts. A ZTR mower is needed with a horizontal engine that does not require a mule drive.

Gearboxes may be used to convert a horizontal shaft drive to a vertical shaft drive. However, conventional gearboxes have gaseous pressure that builds up inside the gearbox as temperatures increase. In the past, spring-loaded vents have been used to vent gearboxes to atmosphere, with venting parts extending out through the gearbox wall. These vents present packaging issues, and may require cutting or modifying the mower frame next to the gearbox wall where the vent is located. A ZTR mower is needed with a gearbox vent having fewer parts and lower cost than conventional spring-loaded gearbox vents, lower risk of damage during assembly or operation, and reduced or eliminated packaging issues.

SUMMARY OF THE INVENTION

A zero turning radius mower includes an internal combustion engine having a flywheel rotating on a horizontal axis and connected to an input shaft of a right angle gearbox. A pair of hydrostatic transmissions are driven by a belt engaged to an output shaft of the gearbox. A mower deck also is driven by the belt. The engine and gearbox are mounted to a frame within a turning circle having a vertical axis between the pair of hydrostatic transmissions and a perimeter at an outer edge of the pair of rear traction drive tires. A vent passage is provided through the output shaft of the gearbox, and a rotary fan having a central hub also is mounted to the output shaft.

DESCRIPTION OF THE PREFERRED EMBODIMENT

Figure 1:
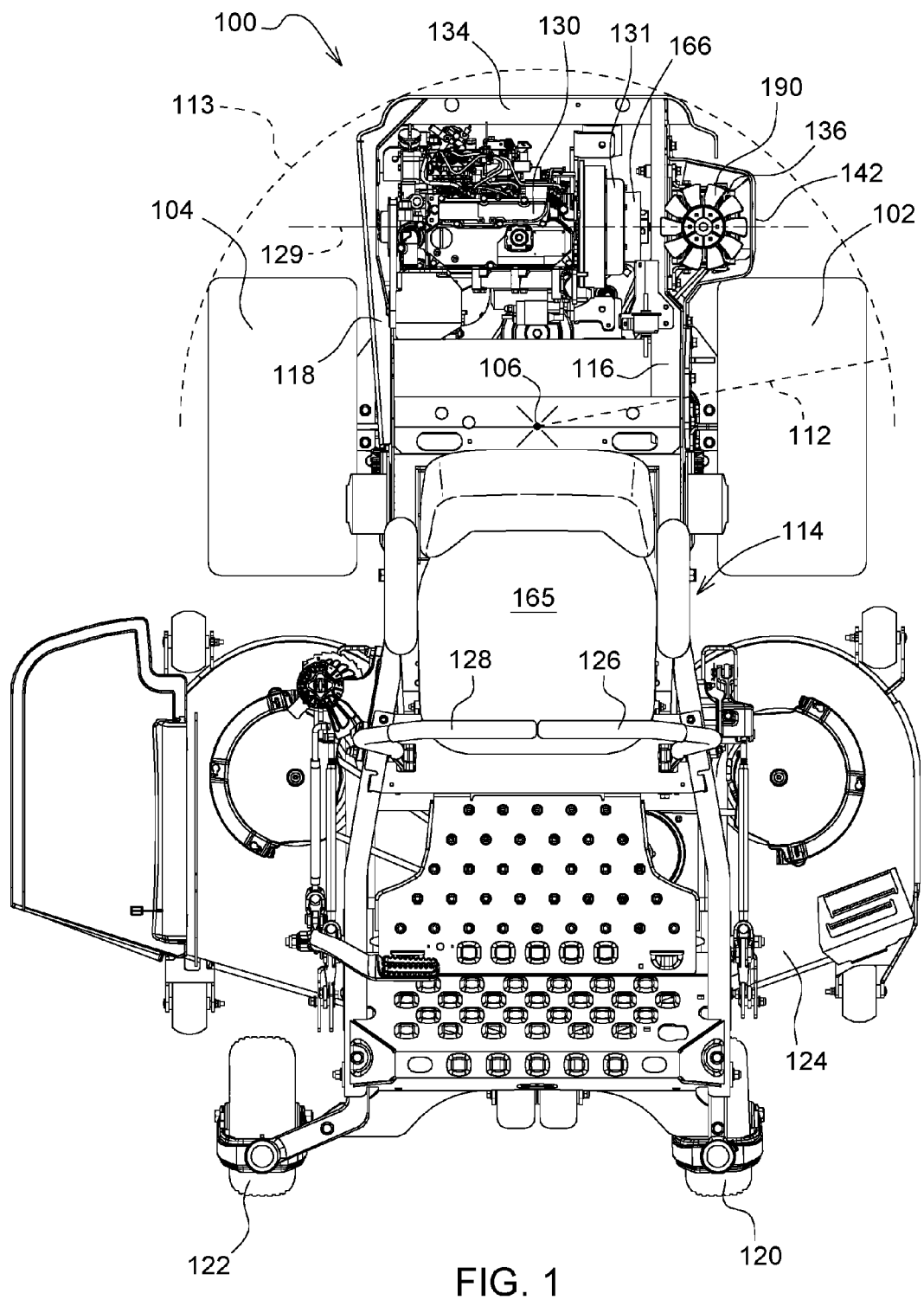
FIG. 1 is a top view of a ZTR mower according to a first embodiment of the invention.
Figure 2:
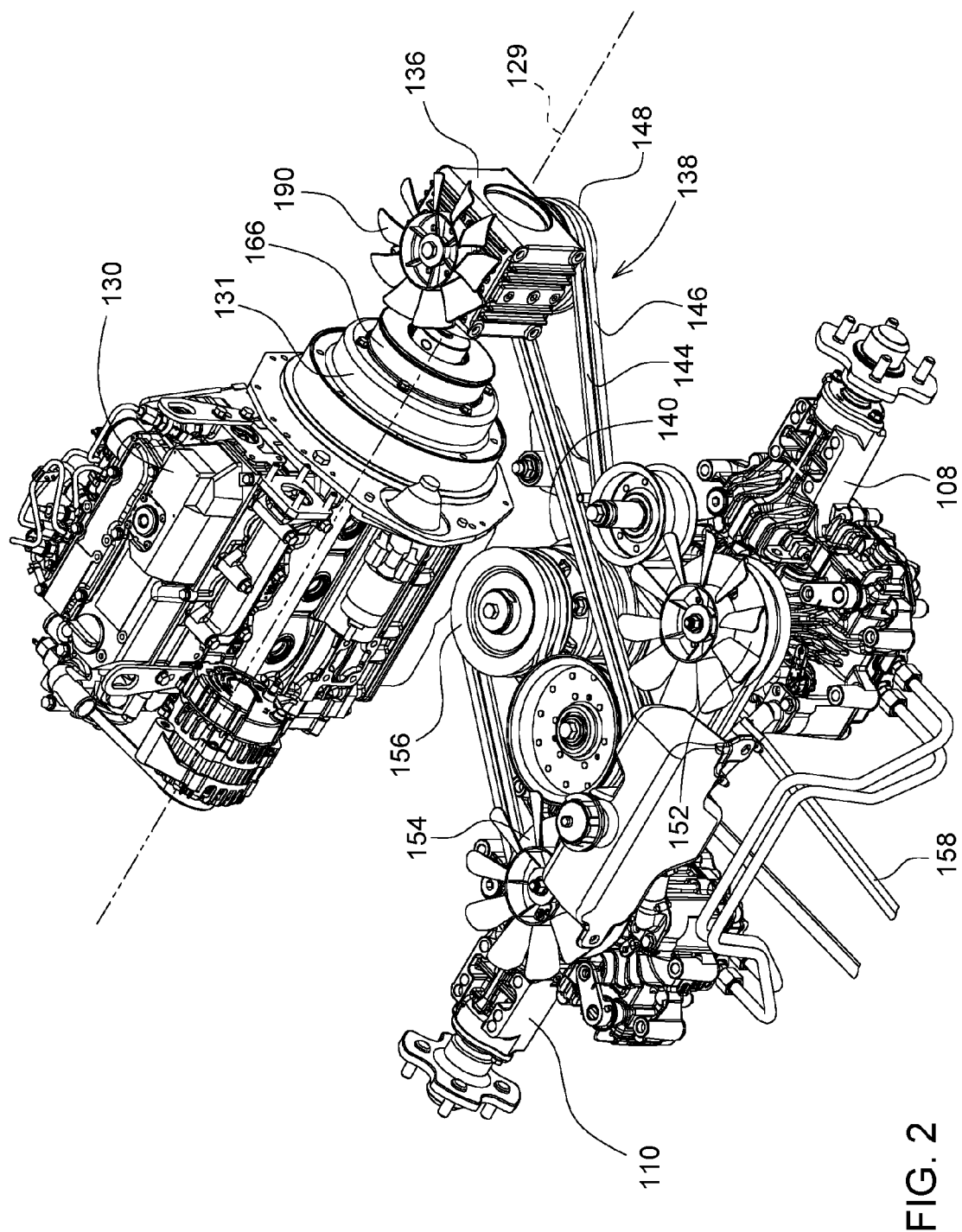
FIG. 2 is a perspective view of the engine and drive train of a ZTR mower according to a first embodiment of the invention.

In the embodiment shown in FIGS. 1-2, zero turning radius ("ZTR") mower 100 has a rear drive wheel 102, 104 on each side of the vehicle that is powered to rotate independently of the other rear drive wheel. The independent rear drive wheels allow the ZTR mower to turn on vertical turning axis 106. The vertical turning axis may be centrally located between a pair of hydrostatic transmissions 108, 110 for the rear drive wheels. The hydrostatic transmissions may be compact integrated zero turn transaxles. The ZTR mower may turn around on central turning axis 106, in which radius 112 and perimeter 113 are defined by the rear drive wheels and tires.

In one embodiment, ZTR mower 100 may have frame 114 with left and right longitudinal frame members 116, 118 supported on a forward end by front wheels 120, 122 and extending rearwardly past operator seat 165 and rear drive wheels 102, 104 where the longitudinal frame members terminate and connect to rear cross member 134. Mower deck 124 may be suspended from the frame between the front and rear wheels. A seated operator may use left and right control levers 126, 128 or other steering controls, to control the pair of hydrostatic transmissions driving the left and right rear drive wheels.

In one embodiment, internal combustion engine 130 may be mounted transversely on the ZTR mower frame behind and rearwardly of operator seat 165 and rear drive wheels 102, 104. The transversely mounted engine may have flywheel 131 rotating on horizontal axis 129 oriented from right to left across the frame of the ZTR mower, perpendicular to the left and right longitudinal frame members. The transversely mounted engine may be mounted with engine mounts on longitudinal frame members 116, 118 and one or more cross members 134.

In one embodiment, the transversely mounted engine, and left and right longitudinal frame members and cross members supporting the engine, are located inside or within the perimeter 113 of radius 112. This enables the ZTR mower to turn around and reverse direction while mowing close to obstacles.

In one embodiment, gearbox 136 may be mounted to the drive shaft or flywheel 131 and may convert the engine's horizontal rotational axis 129 to a vertical rotational axis for common belt drive 138. The common belt drive may power the rear drive wheels through the pair of hydrostatic transmissions 108, 110 and power the rotary cutting blades of the mower deck through jackshaft assembly 140. The gearbox may be a right angle gearbox mounted in bracket 142, which may be attached to the outside of longitudinal frame member 116, but inside perimeter 113 of radius 112.

In one embodiment, as shown in FIG. 2, common belt drive 138 may include a pair of rubber V-belts 144, 146 driven by double pulley 148 secured to the lower end of the gearbox's vertical output shaft 150. The same belt or pair of belts may engage pulleys 152, 154 on vertical shafts on each of the hydrostatic transmissions, and pulley 156 on the vertical shaft of jackshaft assembly 140. Alternatively, the common belt drive may include three rubber V-belts driven by three pulleys mounted to the lower end of the gearbox's vertical output shaft. The jackshaft assembly may include a deck drive clutch that may be engaged and disengaged by an electrical switch. Rubber belt 158 may connect the jackshaft assembly to one or more deck drive pulleys on vertical spindles that rotate a plurality of rotary cutting blades under the mower deck.

Figure 3:
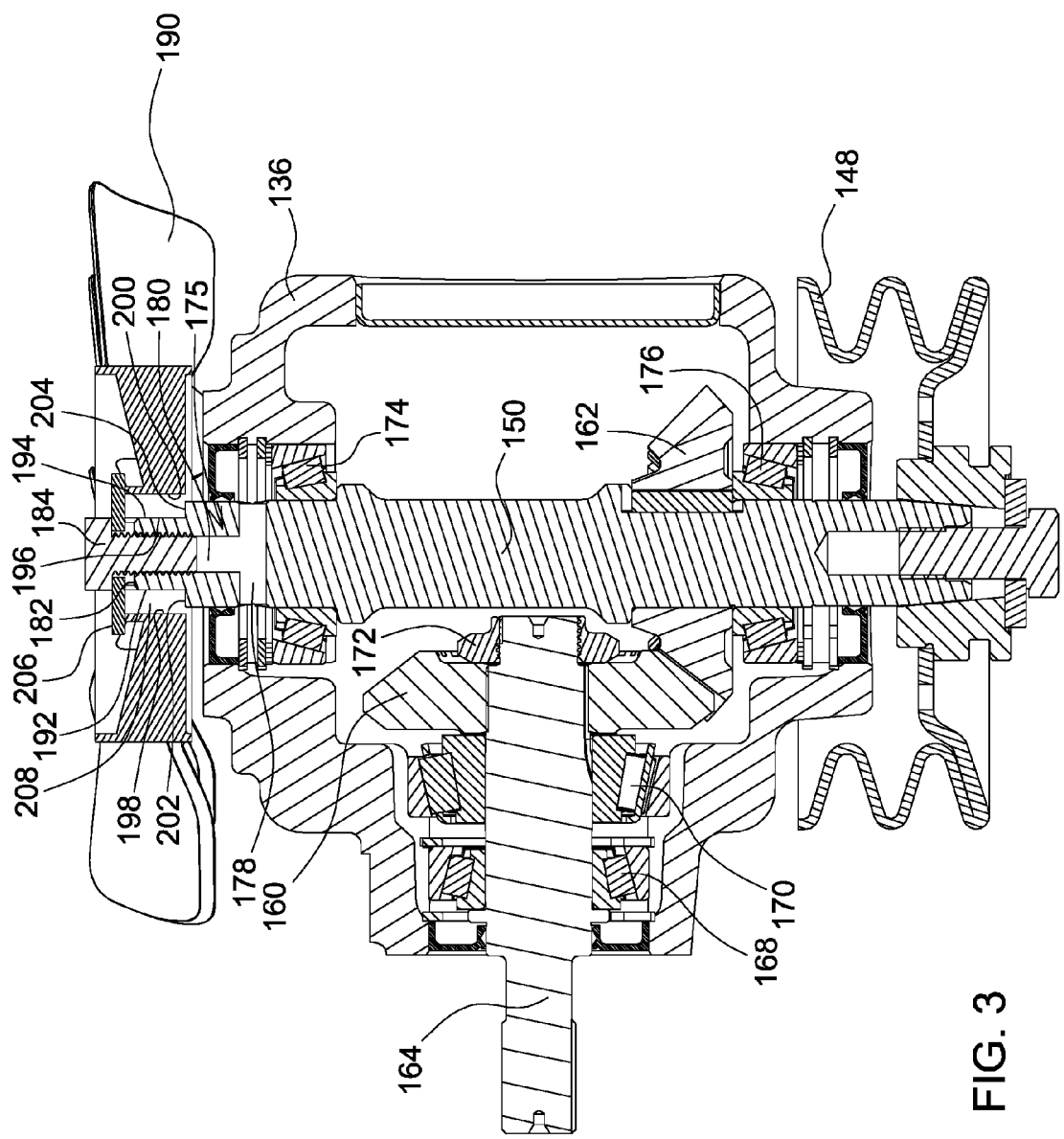
FIG. 3 is a cross section view of a gearbox with a gearbox vent on a ZTR mower according to a first embodiment of the invention.

In one embodiment, as shown in FIG. 3, gearbox 136 may include spiral bevel gears 160, 162 on horizontal input shaft 164 and vertical output shaft 150. The spiral bevel gears and shafts may be disposed at right angles to each other, to change the transmitting direction from the generally horizontal axis of the engine drive shaft to the vertical axis of the common belt drive. The gearbox also may form an oil sump so that the shafts and gears may be adequately coated with lubricating oil while they rotate.

In one embodiment, coupler 166 may connect the engine flywheel 131 or horizontal drive shaft to the gearbox's horizontal input shaft 164. The input shaft may be supported for rotation by bearings 168, 170, and seals that engage the cylindrical surface of the input shaft to prevent leakage of oil or entry of contaminants. Spiral bevel gear 160 may be secured to the input shaft with nut 172. Vertical output shaft 150 may extend through the top and bottom of the gearbox, and may be supported for rotation by upper and lower bearings 174, 176, and upper and lower seals that engage and seal the cylindrical surface of the output shaft. Spiral bevel gear 162 may be secured to the gearbox's vertical output shaft between the upper and lower bearings.

In one embodiment, gearbox 136 may include gearbox vent 175 through vertical output shaft 150. The gearbox vent may be provided through the vertical output shaft to allow internal gearbox pressures to vent to atmosphere, and to prevent high internal pressures from causing seals in the gearbox to burst or leak. The gearbox vent through the vertical output shaft also eliminates the need for a conventional spring-loaded vent, which requires space on the gearbox housing, adds costs and can be damaged easily.

In one embodiment, gearbox vent 175 may include radial vent passage 178 connected to an axial vent passage 180. The radial vent passage may be a cross drilled hole through the diameter of the vertical output shaft, and the axial vent passage may connect the radial vent hole with the top end 182 of the vertical output shaft. To enter radial vent passage 178, gaseous internal pressures in the gearbox may pass around upper bearing 174. Radial vent passage 178 may be positioned above upper bearing 174, so that the upper bearing may protect and shield the vent passage from direct oil splash, oil migration and debris clogging. To exit axial vent passage 180, the internal pressures must pass around bolt 184 which secures rotary cooling fan 190 to the vertical output shaft. An air passage may be provided between the bolt threads and the internal threads of axial vent passage 180. For example, bolt 184 may have flats 186, 188 on its opposing sides that prevent the threads from sealing the joint. Alternatively, instead of a flat-sided bolt, a banjo bolt may be used, having a cross drilled hole through its diameter and an axial hole between the cross drilled hole and its threaded end.

Figure 4:
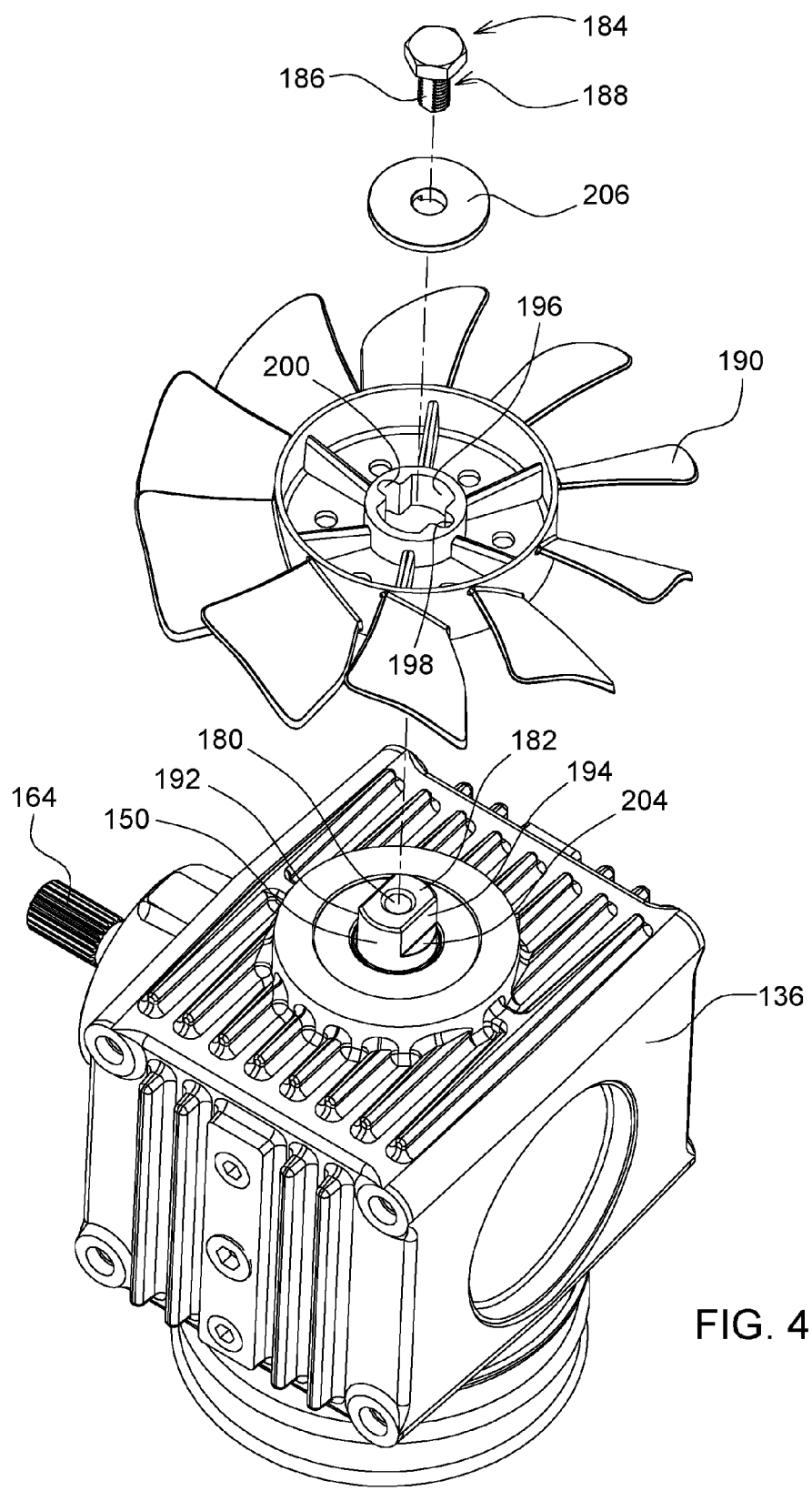
FIG. 4 is a partially exploded perspective view of a gearbox with a gearbox vent on a ZTR mower according to a first embodiment of the invention.

In one embodiment, after escaping the gearbox through axial vent passage 180, the internal pressures may vent to atmosphere through passage 208 in the central hub 196 of rotary cooling fan 190. Passage 208 may include a radial gap and an axial gap between the central hub and vertical output shaft. As shown in FIG. 4, central hub 196 may have an oblong or rectangular opening that fits onto a pair of flats 192, 194 on the top end of the vertical output shaft, so the central hub may seat on the vertical output shaft's shoulders 202, 204. The radial gap may be a pair of slots 198, 200 that extend radially out from the central hub past the vertical output shaft's shoulders, forming air vents between the central hub and vertical output shaft's outer circumference. The axial gap may be between the central hub and the vertical output shaft's top end. For example, the axial gap may be provided by positioning washer 206 on the central hub between bolt 184 and the vertical output shaft's top end 182.

In one embodiment, gearbox vent 175 may be configured to prevent oil from entering and clogging any of the vent passages. For example, the diameter of the vent passages may be sufficiently large to inhibit capillary oil migration, and preferably the diameter of each vent passage may be at least about 3 mm. Additionally, centrifugal forces of the spinning vertical output shaft may throw oil outward away from the vent passages.

Having described the preferred embodiment, it will become apparent that various modifications can be made without departing from the scope of the invention as defined in the accompanying claims.

The invention claimed is:

1. A zero turning radius mower, comprising:
an internal combustion engine mounted transversely on a pair of longitudinal frame members behind an operator seat and a pair of rear drive wheels, the engine rotating a flywheel on a horizontal axis perpendicular to the longitudinal frame members;
a gearbox mounted to one of the longitudinal frame members; the gearbox having a horizontal input shaft driven by the engine and a vertical output shaft engaging a rubber belt; and
a vent passage through the vertical output shaft, and a rotary fan having a central hub mounted to the vertical output shaft.

2. The zero turning radius mower of claim 1 wherein the vent passage includes a radial passage through the vertical output shaft connected to an axial passage that extends from the radial passage through a top end of the vertical output shaft.

3. The zero turning radius mower of claim 2 further comprising a passage in the central hub of the rotary fan.

4. The zero turning radius mower of claim 1 further comprising a rotary fan attached to the vertical output shaft with a bolt threaded to the vent passage in the vertical output shaft, the bolt having flats on opposing sides that provide air passages between the bolt and the vent passage.

5. The zero turning radius mower of claim 1 wherein the central hub of the fan is spaced above a top end of the vertical output shaft.

6. A zero turning radius mower, comprising:
an internal combustion engine mounted transversely on the ZTR mower frame and supported by a pair of longitudinal frame members and a rear cross member behind and rearwardly of an operator seat and a pair of rear drive wheels; the engine connected to a right angle gearbox on one side of the longitudinal frame members;
the gearbox having a horizontal input shaft, a vertical output shaft, a vent passage through the vertical output shaft, and a rotary fan mounted to a top end of the vertical output shaft with a central hub providing a passage between the central hub and the vertical output shaft.

7. The zero turning radius mower of claim 6, wherein the gearbox is mounted to a bracket extending outwardly from one of the longitudinal frame members.

8. The zero turning radius mower of claim 6 wherein the vent passage through the vertical output shaft includes a radial passage and an axial passage connected together.

9. The zero turning radius mower of claim 6 wherein the transversely mounted engine and the gearbox are both within the perimeter of a circle having a center between the rear drive wheels and a radius at an outside edge of the rear drive wheels and tires.

10. A zero turning radius mower, comprising:
an internal combustion engine having a flywheel rotating on a horizontal axis and connected to an input shaft of a right angle gearbox;
a pair of hydrostatic transmissions driven by a belt engaged to an output shaft of the gearbox and rotating a pair of rear traction drive tires;
a mower deck driven by the belt; and
a vent passage through the output shaft of the gearbox and between a hub of a rotary fan and the output shaft.

11. The zero turning radius mower of claim 10 further comprising pair of belts engaged to an output shaft of the gearbox and driving the pair of hydrostatic transmissions and the mower deck.

12. The zero turning radius mower of claim 10 wherein the vent passage is located above an upper bearing of the gearbox output shaft.

* * * * *